(12) United States Patent
Forwerck et al.

(10) Patent No.: US 9,255,507 B2
(45) Date of Patent: Feb. 9, 2016

(54) REAGENT INJECTION SYSTEM FOR EXHAUST OF TURBINE SYSTEM

(71) Applicant: LP Amina LLC, Charlotte, NC (US)

(72) Inventors: Mark A. Forwerck, Marvin, NC (US); Lawrence J. Muzio, Laguna Niguel, CA (US); Matthew Zedler, Midlothian, VA (US)

(73) Assignee: LP AMINA LLC, Charlotte, NC (US)

( * ) Notice: Subject to any disclaimer, the term of this patent is extended or adjusted under 35 U.S.C. 154(b) by 0 days.

(21) Appl. No.: 14/741,345

(22) Filed: Jun. 16, 2015

(65) Prior Publication Data

US 2015/0361850 A1 Dec. 17, 2015

Related U.S. Application Data

(60) Provisional application No. 62/013,424, filed on Jun. 17, 2014.

(51) Int. Cl.
*F01N 3/20* (2006.01)
*F02C 6/18* (2006.01)

(52) U.S. Cl.
CPC ............... *F01N 3/20* (2013.01); *F01N 3/2066* (2013.01); *F02C 6/18* (2013.01); *F01N 2610/02* (2013.01); *F23J 2219/10* (2013.01); *Y02T 10/24* (2013.01)

(58) Field of Classification Search
CPC ............... B01D 2251/2062; F01N 2610/02; F01N 3/2066; F02C 6/18; F23J 2219/10; Y02E 20/16; Y02T 10/24
USPC ............ 60/39.5, 39.182, 274, 299, 301, 302, 60/286, 295, 303, 324; 423/239.1; 422/28
See application file for complete search history.

(56) References Cited

U.S. PATENT DOCUMENTS

| | | | | |
|---|---|---|---|---|
| 4,473,536 A * | 9/1984 | Carberg et al. | ............ | 423/239.1 |
| 5,047,220 A * | 9/1991 | Polcer | ............ | 423/239.1 |
| 5,555,718 A * | 9/1996 | Anderson et al. | ............ | 60/783 |
| 7,107,774 B2 * | 9/2006 | Radovich | ............ | 60/778 |
| 7,824,636 B1 | 11/2010 | Kraemer et al. | | |
| 8,402,755 B2 * | 3/2013 | Sengar et al. | ............ | 60/299 |
| 8,495,986 B2 * | 7/2013 | Reba | ............ | B23P 6/00 123/470 |
| 2002/0029557 A1 | 3/2002 | Tobo et al. | | |
| 2009/0282803 A1* | 11/2009 | Bono et al. | ............ | 60/39.5 |
| 2012/0102951 A1 | 5/2012 | Kraemer et al. | | |
| 2013/0031910 A1* | 2/2013 | Merchant et al. | ............ | 60/772 |

OTHER PUBLICATIONS

International Search Report and Written Opinion mailed Sep. 4, 2015 regarding Application No. PCT/US2015/036089.

* cited by examiner

*Primary Examiner* — Steven Sutherland
(74) *Attorney, Agent, or Firm* — Foley & Lardner LLP

(57) ABSTRACT

A reagent injection system for a catalytic emissions reduction assembly of a combustion turbine that includes an exhaust duct and at least one injector. The exhaust duct includes a first section including an entrance end and an exit end, wherein the entrance end is configured to be fluidly coupled to the combustion turbine to receive exhaust gases therefrom. The exhaust duct also includes and a second section having an entrance end that is fluidly coupled to the exit end of the first section. The at least one injector is operatively coupled to one of the first and second sections, and each injector is configured to inject a reagent into the exhaust gases flowing through the exhaust duct.

25 Claims, 5 Drawing Sheets

REAGENT INJECTION SYSTEM FOR EXHAUST OF TURBINE SYSTEM

CROSS-REFERENCE TO RELATED PATENT APPLICATIONS

This Application claims the benefit of, and priority to, U.S. Provisional Patent Application No. 62/013,424, filed on Jun. 17, 2014, the disclosure of which is hereby incorporated by reference in its entirety.

TECHNICAL FIELD

This application relates generally to the field of combined and simple cycle combustion turbines with and without heat recovery steam generators, respectively. More specifically, this application relates to injection systems configured to inject a compound (e.g., ammonia, urea, etc.) for use with combined and simple cycle combustion turbines with and without heat recovery steam generators, respectively.

BACKGROUND

Global demand for power continues to increase and, accordingly, the global production of power using nitrogen bearing fuels (e.g., coal, oil, etc.) continues to increase to feed this increasing demand. However, combusting nitrogen bearing fuels produces $NO_x$ in the emissions, which leads to air pollution when released into the atmosphere. The $NO_x$ contribution to air pollution may lead to environmental concerns, such as smog, fine particulate, and Ozone ($O_3$). More stringent pollution requirements and regulations are being imposed in an attempt to reduce the production of air pollution. Thus, reducing emissions, such as $NO_x$, would benefit the environment while being commercially advantageous as well.

SUMMARY

One embodiment of this application relates to a reagent injection system for a catalytic emissions reduction assembly of a combustion turbine. The reagent injection system includes an exhaust duct and at least one injection port. The exhaust duct comprises a first section and a second section. The first section includes an entrance end and an exit end, the entrance end being configured to be coupled to a combustion turbine to receive exhaust gases therefrom. The exit end of the first section is coupled to the entrance end of the second section. The at least one injection port is operatively coupled to the first section at a location provided between the entrance and exit ends thereof. Each injection port is aligned radially relative to a longitudinal axis of the first section of the exhaust duct, and each injection port is configured to inject a reagent into the exhaust gases flowing through the exhaust duct. The second section may, optionally, have an increasing cross-sectional size moving from an entrance end to an exit end.

Another embodiment relates to a reagent injection system for a catalytic emissions reduction assembly of a combustion turbine. The system includes an exhaust duct and at least one injector. The exhaust duct includes a first section including an entrance end and an exit end, wherein the entrance end is configured to be fluidly coupled to the combustion turbine to receive exhaust gases therefrom. The exhaust duct also includes and a second section having an entrance end that is fluidly coupled to the exit end of the first section. The at least one injector is operatively coupled to one of the first and second sections, and each injector is configured to inject a reagent into the exhaust gases flowing through the exhaust duct.

Another embodiment relates to a method for injecting a reagent into a stream of gases for a selective non-catalytic NOx emissions reduction system of a combustion turbine. The method includes exhausting gases and a first supply of heat energy from the combustion turbine into a first end of an exhaust duct, where the exhaust duct further including a second end that is fluidly coupled to a heat recovery steam generator. The method also includes injecting a supply of reagent via at least one injector into the exhaust duct at an upstream location from the heat recovery steam generator, and distributing the reagent and gases induced by the high velocity gases exiting the combustion turbine. The method further includes introducing a secondary supply of heat energy at a location downstream of the at least one injector through at least one duct burner.

Yet another embodiment relates to a method for injecting a reagent into a stream of gases for a catalytic emissions reduction system of a combustion turbine. The method comprises exhausting gases from the combustion turbine into a first end of an exhaust duct, the exhaust duct further including a second end that is configured to be coupled to a heat recovery steam generator and an expansion throat located between the ends that includes an increasing cross-sectional size moving in a direction from the first end to the second end. The method also comprises injecting a supply of reagent via an injection port into the exhaust duct at an upstream location from the expansion throat. The method also comprises distributing the reagent and gases utilizing turbulence induced by the high velocity exiting the combustion turbine and the downstream expansion throat.

DETAILED DESCRIPTION

Referring generally to the Figures, disclosed in this application are systems and methods for injecting a reagent or compound into a stream of gases exiting from an energy producing device, such as a turbine (e.g., gas or liquid fuel fired turbine assemblies) or an engine (e.g., combustion engine, gas turbine, etc.). For example, the reagent may comprise aqueous ammonia, anhydrous ammonia, and/or aqueous urea. Each reagent may be injected in a liquid state or a vapor state. The injection systems and methods disclosed herein may inject the reagent into a stream of exhaust gases passing from a combustion turbine assembly to a catalytic $NO_x$ reduction reactor, such as a selective catalytic reduction reactor (SCR).

According to one example, an ammonia injection system is used for catalytic $NO_x$ emissions reduction and is provided between a combustion turbine (e.g., near the exhaust exit of the combustion turbine) and a heat recovery steam generator (HRSG) on a combined cycle unit. According to another example, the injection system is used for catalytic NOx emissions reduction of a simple cycle unit (e.g., an energy producing device without any HRSG) and is provided near the exhaust exit of the combustion turbine.

Each injection system (e.g., ammonia injection system) includes a duct (e.g., pipe, tube, etc.) and at least one injection port that is configured to inject a fluid and/or gaseous material into the stream of gases passing through the exhaust duct from the energy producing device, such as the combustion turbine. Each injection port may be configured to inject ammonia ($NH_3$), such as, for example, ammonia vapor or aqueous ammonia, into the exhaust gases flowing through the exhaust duct. The duct of the system may include an inlet that is configured to be coupled to the combustion turbine to receive exhaust gases therefrom. The duct may include a section having an increasing cross-sectional size moving from an entrance end to an exit end thereof. This section may act as an expansion throat, which may advantageously help distribute the injected ammonia and gases by inducing turbulence.

Combined cycle combustion turbines are used in the power generation industry to improve the overall efficiency of the power generation systems compared to systems utilizing only a single cycle. One such system, referred to as a combined cycle combustion turbine (CCCT) system, combines a combustion turbine with a selective catalytic reduction system. The combustion turbine, either in combined cycle or simple cycle arrangement, is configured to burn a fuel source (e.g., natural gas, synthesis gas, shale gas, biogas, fuel oil, etc.) to produce a first amount of power and relatively high temperature exhaust gases. The fuel source may comprise an ultra-low heating value (LHV) gaseous fuel, such as, for example, blast furnace gas (BFG), air blown fuel resulting from integrated gasification combined cycle (IGCC), or a biomass gasification. The fuel source may comprise a high hydrogen gaseous fuel, such as, for example, a refinery gas, petrochemical gas, or hydrogen gas. The fuel source may comprise a medium LHV gaseous fuel, such as, for example, weak natural gas, landfill gas, coke oven gas, or corex gas. The fuel source may comprise a natural gas (e.g., liquefied natural gas). The fuel source may comprise a high LHV gaseous fuel, such as, for example, liquid petroleum gas (e.g., butane, propane) or refinery off-gas. The fuel source may comprise a liquid fuel, such as, for example, diesel oil, naphtha, crude oils, residual oils, or bio-liquids. The fuel source may include a combination of any of the fuel sources mentioned or any other suitable fuel source.

The exhaust gases are then used to transfer energy to, for example, a steam generator that produces a second amount of power. The heat of the gases produced by the combustion turbine may be used to generate steam, such as, for example, by passing the heat through a HRSG. The temperatures for the direct injection at the combustion turbine exit for the systems, as disclosed herein, may be greater than 400° F. More preferably, the temperature for the direct injection at the combustion turbine exit is greater than 600° F. According to one example, the temperature range for the direct injection at the combustion turbine exit for a system, as disclosed herein, ranges between 800 and 1100° F. According to another example, the temperature range is greater than 1100° F. The transfer of energy (e.g., heat energy) from the exhaust gases produced by the combustion turbine may take place, for example, in a boiler (e.g., a heat recovery boiler), which may produce water and steam. In turn, the steam produced by the boiler may be used to drive a steam turbine to produce power (e.g., the second amount of power). Each turbine (e.g., combustion turbine, steam turbine) of the system may be configured to power a unique generator, or alternatively, multiple turbines of the system may be used to power a common generator.

The systems and methods, as disclosed herein, may also be configured to reduce the amount of undesirable compounds in the exhaust gases. For example, the reduction of nitrogen oxides ($NO_x$), carbon monoxide (CO), and other undesirable air pollutants may be achieved using catalysts. A selective catalytic reduction (SCR) assembly and process may be utilized to convert $NO_x$ into water ($H_2O$) and diatomic nitrogen ($N_2$).

Figure 1:
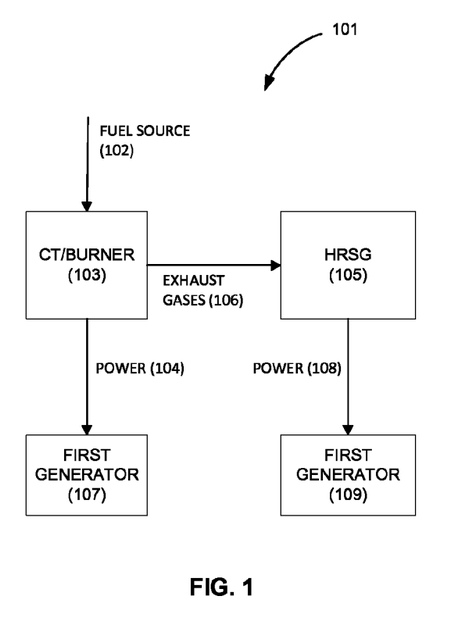
FIG. 1 is a schematic diagram of an exemplary embodiment of a combined cycle combustion turbine and selective catalytic reduction system.

FIG. 1 illustrates a schematic of an exemplary embodiment of a combined cycle combustion turbine system 101. The system includes a combustion turbine 103, an HRSG 105, a first generator 107, and a second generator 109. The combustion turbine 103 is configured to produce a first amount of power 104 and heated exhausted gases 106 from an inputted fuel source 102. As shown, the first amount of power 104 is transferred to a first generator 107, and the exhaust gases 106 are transferred to the HRSG 105, such as through a conveyor (e.g., duct, pipe, tube, conduit, etc.). The HRSG 105 may use the heat from the exhaust gases 106 to generate steam, which in turn produces a second supply of power 108. For example, the HRSG 105 may include a steam turbine or other device that turns the energy of steam into work or power, such as the second supply of power 108. As shown, the second supply of power 108 is transferred to a second generator 109.

Figure 2:
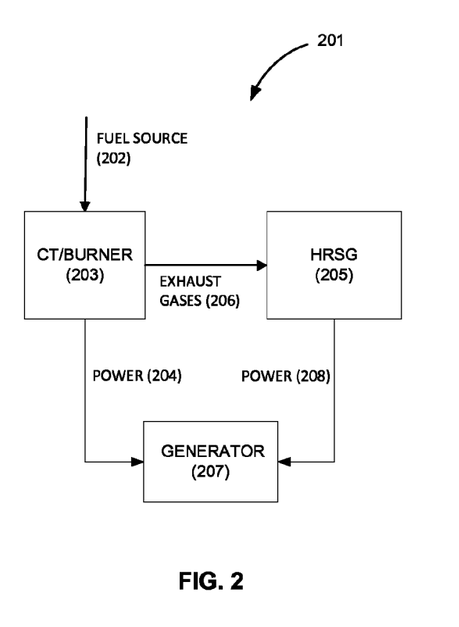
FIG. 2 is a schematic diagram of another exemplary embodiment of a combined cycle combustion turbine and selective catalytic reduction system.

FIG. 2 illustrates a schematic of another exemplary embodiment of a combined cycle combustion turbine system 201 that includes a combustion turbine 203, an HRSG 205, and a single generator 207. The combustion turbine 203 and the HRSG 205 may be configured according to the examples disclosed herein. For example, the HRSG 205 may include a steam turbine or other device that turns the energy in exhaust gases (e.g., heated gases) produced by the combustion turbine 203 into a second supply of power 208. As shown, the generator 207 is configured to receive both the first supply of power 204 from the combustion turbine 203 and the second supply of power 208 from the HRSG 205.

Figure 3:
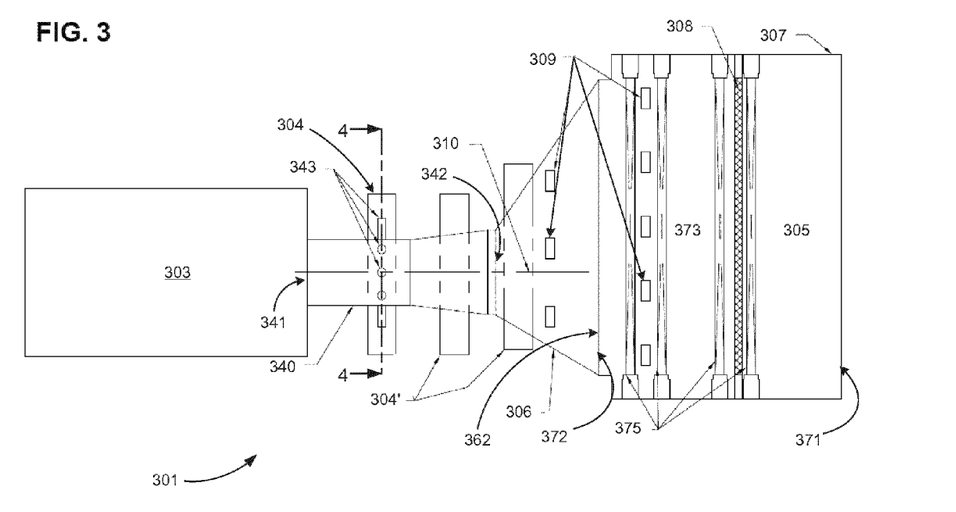
FIG. 3 is a side view of an exemplary embodiment of a combined cycle combustion turbine and selective catalytic reduction system.

FIGS. 3-6 illustrate an exemplary embodiment of a combined cycle system 301 that includes a combustion turbine (CT) 303, an injection assembly 304 (e.g., injection system), and an HRSG 305. The injection assembly 304 is configured to inject a compound (e.g., a reagent, a material, an element, etc.) into the system 301 and, as shown in FIG. 3, is located (e.g., provided) between the CT 303 and the HRSG 305. The location of the injection assembly 304 allows the compound to be injected into fluid exiting the CT 303, such as flow of heated exhaust gases. The CT 303 is configured to convert a fuel source, which is introduced into the CT via an inlet thereof, into power and heated exhaust gases (e.g., flue gas), which are then passed downstream to the injection assembly 304 and the HRSG 305. The HRSG 305 is configured to convert heat, such as from heated exhaust gases, into steam and power.

According to an exemplary embodiment, the injection assembly 304 is configured for $NO_x$ reduction (i.e., to reduce the amount of nitrogen oxides present in the gases). The $NO_x$ reduction may be achieved utilizing a catalyst. For example, the reduction of $NO_x$ may be achieved through an SCR that uses a catalyst to aid in the conversion of $NO_x$ into $N_2$ and $H_2O$. For example, base metal catalysts, typically utilizing a titania carrier impregnated with the active components (e.g., oxides of tungsten and vanadium), and/or any suitable other catalyst may be utilized in the systems and methods. Also for example, a CO oxidation catalyst may be introduced at a location just downstream of the SCR $NO_x$ catalyst in a "back to back" (e.g., front to back, in-series, etc.) arrangement, which may advantageously lead to a reduced amount of ammonia slip (i.e., ammonia that passes through the SCR un-reacted). The reduced ammonia slip is accomplished in the CO oxidation catalyst design, where the CO oxidation precious metals (e.g., platinum) are applied to a layer of $NO_x$ catalyst. In this arrangement the $NO_x$ catalyst layer removes the majority of the $NO_x$ and then the CO catalyst layer oxidizes the CO, and any remaining ammonia is reacted with remaining $NO_x$ in this second $CO/NO_x$ combined second catalyst layer. This arrangement is further advantageous when used with emission reduction systems on combustion turbine units that require both CO and $NO_x$ emissions reduction, because, for example, this arrangement allows for installing the ammonia injection upstream of the CO catalyst layer, thereby allowing the HRSG or simple cycle CT exhaust to be designed shorter in length, which saves both packaging (e.g., volume, space) and cost. Traditionally designed CO catalysts cannot be installed downstream of the ammonia injection point, because the ammonia will contaminate the CO catalyst. Ammonia passing through a CO catalyst containing only precious metals (e.g., platinum) for the CO oxidation reaction and not containing an active metal, such as titania carrier with oxides of tungsten and vanadium for $NO_x$ removal, would deactivate the CO oxidation catalyst.

As shown in FIG. 3, the injection assembly 304 includes an exhaust duct 340 (e.g., tube, pipe, etc.) that is configured to receive the heated exhaust gases from the CT 303. The exhaust duct 340 includes a first end 341 (e.g., an inlet, an entrance end, etc.) that is operatively coupled to (e.g., in fluid communication with) the CT 303. The exhaust duct 340 also includes a second end 342 (e.g., an outlet, an exit end, etc.), which may be operatively coupled to the HRSG 305. As shown, the exhaust duct 340 includes a first section (e.g., upstream section) having a cylindrical shape, which extends from the CT 303, and a second section (e.g., a downstream section) having a conical (e.g., a frusto-conical) shape, which extends from the first section toward the HRSG 305. The exhaust duct 340 may include a fewer or greater number of sections than shown, and each section may have any suitable configuration (e.g., shape, length, etc.).

The system 301 may also include an expansion throat 306, which may be integrally formed with the exhaust duct 340 or formed separately from the exhaust duct 340 and coupled thereto. For the systems including an expansion throat 306, the injection assembly 304 may be provided upstream (relative to the direction of flow of the gases) from the expansion throat 306, such that the injected reagent carries downstream from the injected location(s) into the expansion throat 306. As shown in FIG. 3, the expansion throat 306 has a first end that is operatively coupled to the second end 342 of the exhaust duct 340 to fluidly couple (e.g., fluidly connect, etc.) the exhaust duct 340 and the expansion throat 306. The expansion throat 306 also has a second end 362 that is operatively coupled to the HRSG 305 or a housing in which the HRSG is disposed to fluidly couple the exhaust duct 340 to the HRSG 306 through the expansion throat 306. The expansion throat 306 is configured to have an increasing size (e.g., cross-sectional area) moving in a direction (along a longitudinal axis 310) from the first end 341 toward the second end 342 of the exhaust duct 340. For example, the expansion throat 306 may have a conical (e.g., a frusto-conical) shape that becomes larger moving away from the CT 303 and toward the HRSG 305. This arrangement may advantageously induce turbulence to improve distribution of the ammonia ladened gases, such as passing through the SCR catalysts, which may advantageously improve the $NO_x$ reduction.

The injection assembly 304 includes at least one injector 343 (e.g., injection port, orifice, etc.) configured to introduce a compound/reagent, such as a reductant (i.e., a reducing agent), into the exhaust duct 340 to mix with the exhaust gases flowing through the exhaust duct. For example, $NH_3$ may be used as the reducing agent and introduced (e.g., injected) into the exhaust duct 340 of the system 301 through one or more injectors 343. By introducing the reagent into the higher velocity exhaust gases from the CT 303, the increased velocity alone and/or in combination with shape of the expansion throat 306 may advantageously increase the turbulence from the exhaust duct 340 to the HRSG 305 to improve mixing (e.g., provide a better distribution) of $NH_3$ and $NO_x$. According to one example, the gas velocity is above 3,600 feet per minute (fpm). According to one example, the gas velocity is above at 21,000 fpm.

According to an exemplary embodiment, the system includes an ammonia injection grid including less than 100 injection ports provided at different locations around a section (e.g., portion) of the exhaust duct. According to another exemplary embodiment, the ammonia injection grid includes less than 20 injection ports provided at different locations around the exhaust duct. According to yet another exemplary embodiment, the ammonia injection grid includes less than 10 injection ports provided at different locations around the exhaust duct. For example, the ammonia injection grid may include nine injectors provided uniformly (or uniquely) spaced around the exhaust duct.

Figure 4:
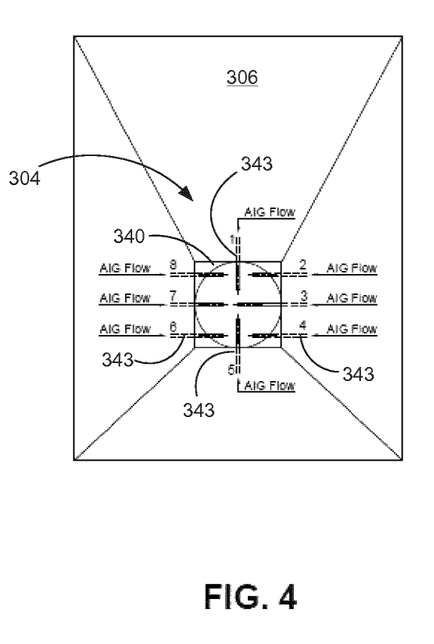
FIG. 4 is a cross-sectional view taken along lines 4-4 of FIG. 3, showing an exemplary embodiment of an arrangement of injectors for use in a system, such as the system of FIG. 3.

FIG. 4 illustrates an exemplary embodiment of an arrangement of injectors 343. As shown, the injection assembly 304 includes eight injectors 343 extending into the exhaust duct 340 to introduce a reagent into the exhaust duct 340. For ease of reference, each of the eight injectors 343 has been labeled (in FIG. 4) with a number from 1-8, which corresponds to the respective injector 343 (e.g., the number "1" corresponds to the "first injector," the number "2" corresponds to the "second injector," and so forth). As shown, a first injector 343 extends transversely (e.g., perpendicular) to the longitudinal axis 310 along a vertical axis and into the exhaust duct 340 through an upper portion (e.g., an upper wall) of the exhaust duct 340. Also shown, the second, third, and fourth injectors 343 extend transversely to the longitudinal axis 310 along a horizontal axis and into the exhaust duct 340 through a first side portion (e.g., a right-side wall) of the exhaust duct 340. The second, third, and fourth injectors 343 may be configured generally parallel to one another. For example, the second, third, and fourth injectors 343 may have a stacked configuration, where the third injector 343 is provided above the fourth injector 343 (either in contact therewith or offset therefrom), and where the second injector 343 is provided above the third injector 343 (either in contact therewith or offset therefrom). Also shown, the fifth injector 343 extends transversely to the longitudinal axis 310 along the vertical axis and into the exhaust duct 340 through a lower portion (e.g., a lower wall) of the exhaust duct 340. Also shown, the sixth, seventh, and eighth injectors 343 extend transversely to the longitudinal axis 310 along the horizontal axis of the exhaust duct 340 and into the exhaust duct 340 through a second side portion (e.g., a left-side wall) of the tube. The sixth, seventh, and eighth injection ports may be configured generally parallel to one another. For example, the sixth, seventh, and eighth injectors 343 may have a stacked configuration, where the seventh injector 343 is provided above the sixth injector 343 (either in contact therewith or offset therefrom), and where the eighth injector 343 is provided above the seventh injector 343 (either in contact therewith or offset therefrom).

Each injector 343 of the injection system 304 may be configured to extend a depth into the exhaust duct 340 (e.g., relative to the wall being extended through) that is common among all of the injectors 343 or may be different than the depth of one or more of the other injectors 343. As shown in FIG. 4, the injectors 343 extend at various distances (e.g., depths) into the exhaust duct 340, such that the injection assembly 304 introduces reagent (e.g., $NH_3$) at various locations in the cross-section of the tube (rather than generally at the same location). This arrangement may advantageously improve mixing of the reagent and the exhaust gases passing through the exhaust duct 340, since the reagent is not focused (e.g., concentrated) at any one location (or a couple locations). Thus, the various locations at which the injectors 343 inject the reagent are tailored to more evenly distribute the injected reagent across the cross-section of the exhaust duct 340 to promote improved mixing between the exhaust gases and the reagent.

As shown in FIG. 3, all eight injectors 343 are generally co-planar through a cross-section across the longitudinal axis 310 that is cut, for example, transverse to the longitudinal axis 310 in a side-to-side direction and a top-to-bottom direction. Alternatively, the injectors 343 of the injection system 304 may be configured to not be co-planar, such as having staggered locations moving from the first end 341 toward the second end 342 of the exhaust duct 340 of the injection assembly 304. Also shown in FIG. 3, the injection assembly 304 may be coupled to the first section of the exhaust duct 340. Alternatively, the injection assembly 304 may be coupled to other elements. As non-limiting examples, the injection assembly may be coupled to the second section of the exhaust duct 340 or to the expansion throat 306 both of which are represented by the elements labeled 304' in FIG. 3. It is noted that the inclusion of injection assemblies 304' and injection assembly 304 in FIG. 3 is not meant to denote that the system 301 must include more than one injection assembly 304 but is meant to illustrate that the injection assembly may be located at these (and more) various positions. It is noted that the system may optionally include more than one injection assembly. It is also noted that the injectors of each injection assembly may have alternative arrangements to the arrangement of FIGS. 3 and 4, of which FIGS. 5 and 6 show two non-limiting examples.

Figure 5:
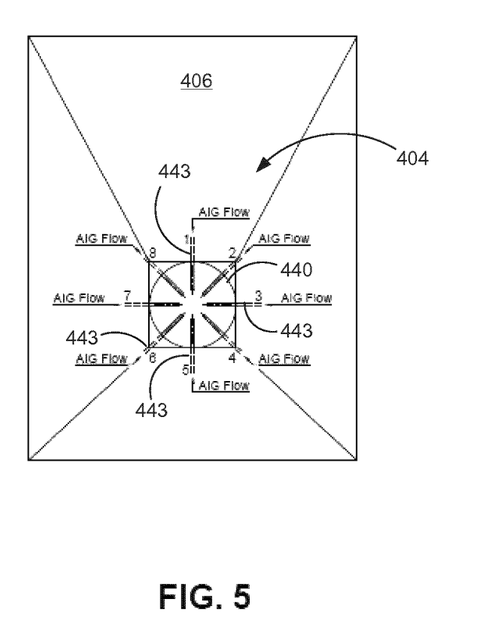
FIG. 5 is another cross-sectional view taken along lines 4-4 of FIG. 3, showing another exemplary embodiment of an arrangement of injectors.

FIG. 5 illustrates another exemplary embodiment of an arrangement of a plurality of injectors 443. As shown, the injection assembly 404 includes eight injectors 443 extending into the exhaust tube 440, which is fluidly connected to an expansion throat 406, to introduce a reagent into the exhaust tube 440. For ease of reference, each of the eight injectors 443 has been labeled (in FIG. 5) with a number from 1-8, which corresponds to the respective injector 443 (e.g., the number "1" corresponds to the "first injector," the number "2" corresponds to the "second injector," and so forth). As shown, the exhaust tube 440 has a circular shape (e.g., in cross-section) and each injector 443 is aligned to extend radially from the approximate center of the circular exhaust tube 440. The injectors 443 extend in different radial directions around the exhaust tube 440. As shown, the first and fifth injectors 443 extend in a vertical radial direction into the exhaust tube 440 through opposite upper and lower openings in the exhaust tube 440, respectively. Thus, the first and fifth injectors 443 are collinear (e.g., coaxial). Also shown, the third and seventh injectors 443 extend in a horizontal radial direction into the exhaust tube 440 through opposite side openings in the exhaust tube 440, respectively. Thus, the third and seventh injectors 443 are collinear (e.g., coaxial). The second injector 443 extends in a radial direction that lies between the first and third injectors 443 (e.g., at an angle relative to the first and third injectors as shown in FIG. 5). The sixth injector 443 extends in a radial direction that lies between the fifth and seventh injectors 443 (e.g., at an angle relative to the fifth and seventh injectors as shown in FIG. 5). Thus, the second and sixth injectors 443 are collinear (e.g., coaxial). The fourth injector 443 extends in a radial direction that lies between the third and fifth injectors 443 (e.g., at an angle relative to the third and fifth injectors as shown in FIG. 5). The eighth injector 443 extends in a radial direction that lies between the seventh and first injectors 443 (e.g., at an angle relative to the seventh and first injectors as shown in FIG. 5). Thus, the fourth and eighth injectors 443 are collinear (e.g., coaxial).

Each injection assembly 304, 404 may include a fewer number or a greater number of injectors, which may be arranged having different configurations than the arrangements shown in FIGS. 4 and 5. For example, an injection assembly may be configured having four injectors. Having fewer injectors advantageously decreases cost and complexity, but having too few injectors may reduce the effectiveness of the mixing of the gases and reagent. One advantage of the injection systems disclosed herein is that the reagent (e.g., ammonia) can be injected in liquid form, thereby eliminating the need to vaporize the reagent (and the vaporization equipment).

Figure 6:
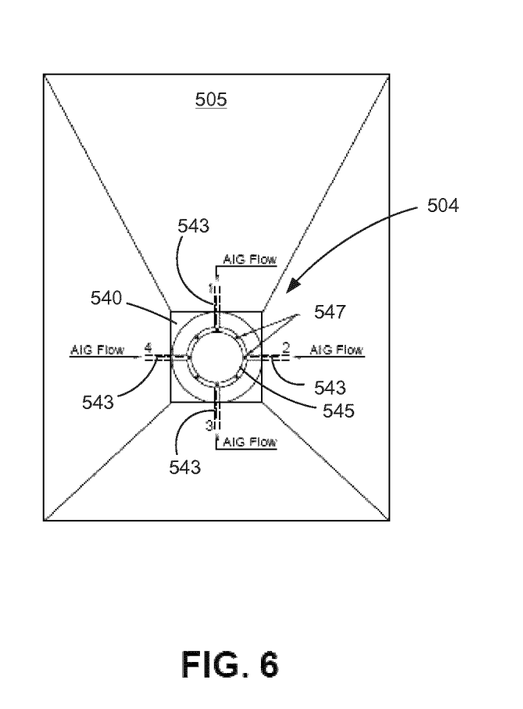
FIG. 6 is another cross-sectional view taken along lines 4-4 of FIG. 3, showing yet another exemplary embodiment of an arrangement of injectors.

FIG. 6 illustrates another exemplary embodiment of an injection assembly 504 that includes four injectors 543 aligned around an exhaust tube 540 that is fluidly connected to an HRSG 505. The four injectors 543 may be aligned radially from the center of the exhaust tube 540, such that a spacing is provided between each pair of adjacent injectors 543. For example, each pair of adjacent injectors 543 may be aligned at an angle of about 90° (ninety degrees) relative to the other injector of the pair.

As shown in FIG. 6, the injection assembly 504 also includes a dispenser 545 that is fluidly connected to each injector 543 to receive the reagent from each injector 543. The dispenser 545 is configured to carry the reagent and includes one or more nozzles 547 (e.g., orifices, ports, etc.) that are configured to dispense the reagent into the exhaust tube 540 at various locations. The shape of the dispenser 545 may be tailored to the specific application. As shown in FIG. 6, the dispenser 545 has an annular shape that is concentric to the cylindrical exhaust tube 540. However, the dispenser 545 may have a square tube shape, a rectangular tube shape, or other suitable shape that may be tailored to the shape of other elements of the system, such as the exhaust tube. As shown, the outer diameter of the annular dispenser 545 is smaller than the inner diameter of the exhaust tube 540, such that there is a volume of space between the outer surface of the dispenser 545 and the inner surface of the exhaust tube 540. This volume of space allows gases exiting a CT to pass between the dispenser 545 and the exhaust tube 540. One or more nozzles 547 may be disposed in the outer surface of the dispenser 545, such that the reagent is dispensed into the gases flowing in the volume of space provided between the dispenser 545 and the exhaust tube 540. For example, four nozzles 547 may be disposed in the outer surface of the dispenser 545, with one nozzle 547 being disposed between each pair of injectors 543. The dispenser 545 may also include an inner diameter that defines a second volume of space inside of the inner diameter. The second volume of space allows gases existing a CT to pass through to the HRSG 505. The dispenser 545 may include one or more nozzles 547 disposed in the inner surface having the inner diameter. For example, the dispenser 545 may include a nozzle 547 disposed in the inner surface between each pair of adjacent injectors 543. Also for example, the dispenser 545 may include a nozzle 547 disposed in the inner surface associated with (e.g., aligned with) each injector 543. Thus, according to one exemplary embodiment, the dispenser 545 includes four nozzles 547 disposed in the outer surface, with each nozzle 547 offset radially at about every 90° (ninety degrees) from each adjacent nozzle, and also includes eight nozzles 547 disposed in the inner surface, with each nozzle 547 offset radially at about every 45° (forty-five degrees) from each adjacent nozzle.

Thus, the injection assemblies 404, 504 are arranged such that each injector 443, 543 has a different radial alignment relative to the longitudinal axis and to the other injectors. In other words, an angular spacing is provided between each pair of adjacent injectors, and the angular spacing may be the same or different for each pair of injectors in the grid compared to the other pairs. Each injector may be configured to extend in a direction that is generally perpendicular to the longitudinal axis. Alternatively, each injection port may be aligned at an angle relative to the longitudinal axis (e.g., when viewed from a side, top, and/or bottom).

As shown in FIG. 3, each injector 343 of the injection assembly 304 is operatively coupled to the exhaust duct 340 at a location that is upstream from the expansion throat 306 (i.e., between the CT 303 and the expansion throat 306). This arrangement may advantageously improve mixing of the reagent (e.g., ammonia) and the exhaust gases from the CT 303, and improve distribution of the ammonia ladened gases passing through the SCR catalysts to increase the $NO_x$ reduction. The ammonia being injected at multiple radial locations induces mixing in the section (e.g., second section) of the exhaust duct 340 upstream of the expansion throat 306, and the expansion throat 306 induces turbulence of the mixed flow to further improve mixing and spreading out the ammonia prior to passing through the SCR catalysts.

The system 301 may include a housing 307 (e.g., casing) configured to house one or more other elements or components of the system. For example, the housing 307 may be configured to house a member or assembly including a catalyst 308 (e.g., a catalyst assembly), such as an SCR catalyst, CO catalyst, combined SCR/CO catalyst, or any other suitable catalyst/combination of catalysts. As shown in FIG. 3, the HRSG 305 is disposed within the housing 307 of the system 301 and is configured to house a plate having an SCR catalyst. Alternatively, the housing 307 may be configured to house a plurality of catalyst plates, such as, for example, having SCR catalysts. The housing 307 may include an SCR inlet port corresponding to the SCR catalyst plate. The housing may include more than one SCR inlet port, which may correspond to each SCR catalyst plate. The plate-type SCR catalysts may be replaced with alternative catalyst geometries, such as honeycomb configurations, corrugated configurations, or combinations thereof. The housing 307 includes a first end 371 coupled to the exit end of the expansion throat and a second end 372 coupled to or housing the HRSG 305. The housing 307 may define an interior chamber 373 for the fluid flow to pass into from the exhaust duct 340 (and expansion throat 306, if employed), such that the fluid flows through the SCR catalysts to the HRSG 305.

The system 301 may also include one or more heat recovery tubes 375. As shown in FIG. 3, the system include four heat recovery tubes 375, which are provided within the housing 307 in an offset (e.g., separated) side-by-side arrangement. In other words, the heat recovery tubes 375 may have a series (e.g., in-series) configuration, with a second heat recovery tube 375 provided adjacent to and downstream (e.g., as the fluid flows) from a first heat recovery tube 375, with a third heat recovery tube 375 provided adjacent to and downstream from the second heat recovery tube 375, and so forth. Each heat recovery tube 375 may have a hollow configuration to allow a fluid (e.g., water) to be passed (e.g., flow) through the tube, such as from a first end of the tube to a second end of the tube. As shown, each heat recovery tube 375 extends from an upper wall of the housing 307 to a lower wall of the housing 307, such as to allow the fluid to enter and exit the tube through respective openings (e.g., inlet opening, outlet opening) in the housing 307. This arrangement allows for the fluid to be circulated, such as through a heat exchanger and then back through a heat recovery tube. As the hot exhaust gases from the CT pass over the tube, heat is transferred from the exhaust gases to the fluid through the tube. The fluid may be flowing through the tube, such that the heated fluid may be then passed through a heat exchanger to capture the heat energy.

A catalyst assembly 308 (e.g., an SCR assembly) may be provided downstream of the injection system for $NO_x$ reduction. The housing 307 of the system 301 may house one or more plate-type SCR catalysts within a chamber therein (e.g., the interior chamber 373). The mixed exhaust gases and reagent (e.g., $NH_3$) are passed from the outlet of the injection assembly 304 across the plate-type catalyst(s). The mixed gases may be used to generate steam, such as, for example, by passing through an HRSG 305.

The system 301 may include one or more optional supplemental heat inputs (e.g., in addition to the heat produced by the CT 303). For example, the system 301 may include one or more optional supplemental firing duct burners, where each duct burner is configured to increase the heat energy of the exhaust gases coming from the CT 303. As shown in FIG. 3, the system 301 may include a plurality of duct burners 309, which may be provided at various locations. For example, the system 301 may include a plurality of duct burners 309 (e.g., three burners) disposed at various locations on the expansion throat 306, a plurality of duct burners 309 (e.g., five duct burners) disposed at various locations on the housing 307, such as between the first and second heat recovery tubes 375, at other suitable locations of the system 301, and/or any combination thereof. Therefore, it is noted that although FIG. 3 depicts duct burners on both the expansion throat 306 and the housing 307, the duct burners, if employed, may be disposed on only one of the expansion throat and the housing, on both the expansion throat and the housing, or at other suitable locations (alone or in combination with those on the expansion throat and the housing). Originally, it was believed that duct burners would interfere with the operation of the selective reduction of $NO_x$ because the burners would consume the reducing agent before it could react with the $NO_x$. However, we have found that using our injection method a portion of the reducing agent passes through the duct burner zone, allowing SCR or SNCR technology to be employed in the presence of duct burners. Furthermore, we have also seen that $NO_x$ reduction also occurs non-catalytically in this configuration. Moreover, simple cycle units would not employ supplemental heat input, such as via one or more duct burners, because the supplemental heat added after the turbine would go up the stack rather than being turned into power. Thus, a combined cycle unit employing an HRSG is able to transfer the heat into water in the HRSG to produce steam and power.

Figure 7:
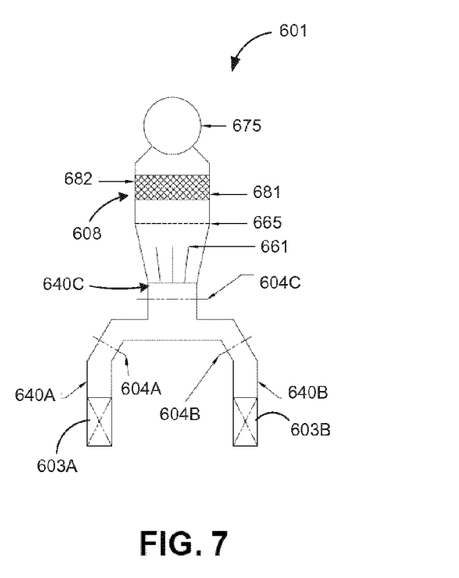
FIG. 7 is a top view of another exemplary embodiment of a combined cycle combustion turbine and selective catalytic reduction system.
Figure 8:
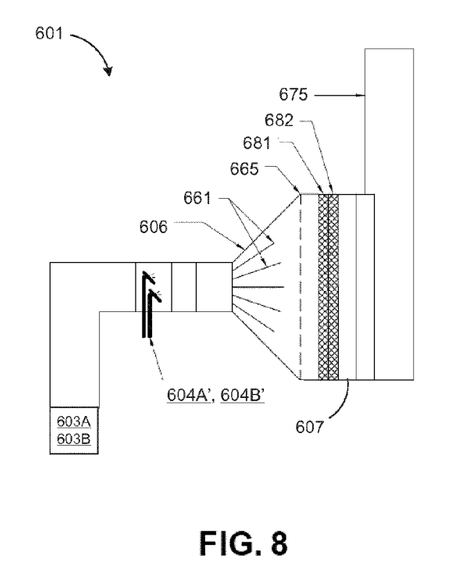
FIG. 8 is a side view of the system of FIG. 7.

FIGS. 7 and 8 illustrate another exemplary embodiment of a combined cycle system 601 that includes a first combustion turbine 603A, a second combustion turbine 603B, a first injection assembly 604A, a second injection assembly 604B, and a catalyst assembly 608 (e.g., a plate-type catalyst assembly) that includes at least one catalyst. Each injection system 604A, 604B is provided between the respective (e.g., associated) CT 603A, 603B and the catalyst assembly 608, and may be fluidly connected to each associated CT and the catalyst assembly 608 with ducting (e.g., piping, tubing, conveyor, or any other suitable device that transfer fluid from one element to another element). As shown in FIG. 7, the system 601 includes a first duct 640A, a second duct 640B, and a third duct 640C. The first duct 640A carries exhaust gases from the first CT 603A to the third duct 640C, and the second duct 640B carries exhaust gases from the CT 603B to the third duct 640C.

As shown in FIG. 7, the first injection assembly 604A is located within the first duct 640A and is configured to inject a reagent into the exhaust gases from the first CT 603A, and the second injection assembly 604B is located within the second duct 640B and is configured to inject a reagent into the exhaust gases from the first CT 603B. Thus, the exhaust gases from each CT is mixed with reagent prior to mixing the exhaust gases from the CTs together. According to another exemplary embodiment, the first and second injection assemblies 604A and 604B are replaced with a single injection assembly 604C that is located within the third duct 640C. Thus, the exhaust gases from the first and second CTs 603A, 603B are mixed in the third duct 640C prior to the injection of the reagent from the injection assembly 604C.

Each injection assembly 604A, 604B, 604C of the system 601 includes at least one injector (e.g., injection port) for introducing a reagent into the exhaust gases exiting from one or both CT 603A, 603B. As an example, $NH_3$ may be injected into the exhaust gases through the at least one injector. Each injection assembly 604A, 604B, 604C may include a plurality of injectors (e.g., an injection grid). As non-limiting examples, each injection assembly 604A, 604B, 604C may be configured the same as, similar to, or different than any other injection assembly disclosed in this application. The exhaust gases from both CTs 603A, 603B may be mixed with one or more reagents in separate ducts, such as in the first and second ducts 640A, 640B, respectively, which may then be fluidly connected after respective mixing and before passing the congregated flow through the catalyst(s); or the exhaust gases from both CTs 603A, 603B may be mixed together then mixed with a reagent, such as in the third duct 640C.

Each injection assembly (e.g., injection assembly 604A, 604B, 604C) may also include a baffle 604A', 604B' (as shown in FIG. 8) that is configured to influence the flow of gases (e.g., exhaust gases, reagent, combination thereof, etc.) through the system 601. For example, a mixing baffle may be provided in the system downstream of an injection port to promote mixing of the exhaust gases from the respective combustion turbine and the reagent introduced through the injection port(s).

As shown in FIG. 8, the system 601 may further include an expansion throat 606 that is located downstream of the mixing locations of the exhaust gases and reagent(s). The expansion throat 606 may have an increasing size (e.g., cross-sectional area) to induce turbulence to further promote mixing of the gases and reagent. One or more diffuser vanes 661 may also be provided in the expansion throat 606 to further influence the flow of gases and reagent through the system 601. Each diffuser vane 661 may, for example, be configured to increase mixing of the gases and reagent, as well as increase the relative cross-sectional area of the flow of gases and reagent to utilize more surface area of the catalyst(s) present in the system. As shown in FIGS. 7 and 8, a plurality of diffuser vanes 661 extend rearward from an inlet of the expansion throat 606 toward the catalyst assembly 608. The diffuser vanes 661 may extend at different angles to promote mixing of the gases and reagent flowing toward the catalyst assembly 608.

The system 601 may be configured to include one or more catalysts, such as in the catalyst assembly 608 to reduce one more compounds. As shown in FIGS. 7 and 8, the system 601 includes a $NO_x$ catalyst (e.g., an SCR $NO_x$ catalyst) 681 and a CO catalyst 682 disposed within a housing 607, which is located at an outlet end of the expansion throat 606. According to one example, the SCR $NO_x$ catalyst 681 is in the form of a first plate and the CO catalyst 682 is in the form a second plate, where the first and second plates are configured in series (e.g., front to back arrangement), with the first and second plates adjacent to one another and abutting one another. According to another example, the two catalyst plates are in series but are separated by a gap. According to yet another example, the CO oxidation catalyst platinum group metals are applied directly to all or some portion of a single $NO_x$ catalyst plate to form a single dual function ($NO_x$ and CO) catalyst plate. The system may include additional plates and/or catalysts, such as in the form of additional plate-type catalysts.

The system 601 may include one or more perforated plates. As shown in FIGS. 7 and 8, a plate 665 having a plurality of openings (e.g., holes, perforations, etc.) may be provided between the expansion throat 606 and the SCR and CO catalysts (e.g., the first and second plates having the catalyst therewith). The perforated plate 665 may influence the flow of gases and reagent leading into the catalysts, such as to achieve improved distribution (e.g., of $NH_3/NO_x$). The perforated plate 665 may extend, for example, between the top and bottom walls and between the side walls where the outlet of the expansion throat 606 meets (e.g., is coupled to) an inlet of the housing 607.

The system 601 may further include a stack 675 that is configured to emit (e.g., vent) the CO/$NO_x$ (or other compound) reduced gases to the atmosphere from the system 601. As shown, the stack 675 is coupled to the housing 607. Alternatively, the stack 675 may be integrally formed with the housing 607. The stack 675 can be arranged according to any suitable configuration.

The injection systems and methods of injecting disclosed herein may provide several advantages over prior systems and methods. One such advantage is the systems and methods as disclosed herein may reduce the time required for mixing of the exhaust gases and reagent (e.g., ammonia). Another such advantage is the systems and methods as disclosed herein may allow for full mixing and vaporization of the exhaust gases and reagent (e.g., ammonia). By injecting the reagent into the high velocity and turbulent region of the system having the smaller cross section at the CT exit, excellent mixing and distribution can be achieved in the system. This mixing produces ammonia to $NO_x$ distribution on the order of 5% RMS. To achieve this level of mixing with an ammonia injection grid (AIG) located adjacent to the catalyst (i.e., 10 to 12 feet space between the AIG and the catalyst), the AIG includes 2,000 or more injection points. Individually adjustable injector flow rates allow for tuning and optimization of the system when it is put into service. Computational Fluid Dynamics (CFD) modeling shows that the liquid ammonia is completely vaporized within about 5 to 10 feet of residence travel at typical combustion turbine exhaust temperatures and velocities. Yet another such advantage is the systems and methods as disclosed herein can be easily retro-fitted with older systems, such as those not having SCR capability, in order to upgrade the system to have SCR $NO_x$ reduction. Yet another such advantage is the systems and methods as disclosed herein vaporize the ammonia without the need for additional components, such as, for example, a vaporizer, a hot gas fan, an electric heater, a complex AIG, as well as other elements that add cost and complexity to the system/method. Some AIGs are installed too close (e.g., 10 to 12 feet) to the catalyst layer to achieve proper distribution, except by using a very large number (e.g., greater than 200 injection ports, greater than 1000 injection ports). Yet another such advantage is the systems and methods as disclosed herein do not require the use of static mixing devices, such as the mixers that are typically used with coal steam turbines.

The injection systems and methods of injecting disclosed herein may provide additional advantages over prior systems and methods. One such advantage is that direct liquid reagent injection can be located in the high velocity gas turbine exhaust stream. The increased turbulence will simplify the injection system and provide a better $NH_3/NO_x$ distribution in addition to the providing benefits with regard to capital cost, operating cost, and constructability. Another advantage is that several injectors at the CT can replace complex AIG systems upstream of SCR reactor. Another advantage is that components, such as vaporizers, hot gas fans, electric heaters, and interconnect piping, can be eliminated. Optionally, a metering pump skid can be employed. Another advantage is that the systems provide reduced parasitic power. Another advantage is that a dual function SCR/CO catalyst, when employed, eliminates separate CO catalyst and frame (e.g., structural components). Another advantage is that the overall horizontal length of the HRSG or simple cycle exhaust can be reduced by approximately 20 ft (or more) by elimination of separate AIG and CO catalyst layer. This may eliminate one HRSG or simple cycle column line.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the injection systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., as exhaust duct, an injection port, etc.) disclosed in one embodiment of the injection systems and methods may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A reagent injection system for a catalytic emissions reduction assembly of a combustion turbine, the reagent injection system comprising:
   an exhaust duct comprising:
      a first section including an entrance end and an exit end, wherein the entrance end is configured to be fluidly coupled to the combustion turbine to receive exhaust gases therefrom; and
      a second section having an entrance end that is fluidly coupled to the exit end of the first section; and
   a plurality of injectors operatively coupled to one of the first and second sections, the plurality of injectors extending radially inward toward a longitudinal axis of the exhaust duct;

wherein each injector of the plurality of injectors is configured to inject a reagent into the exhaust gases flowing through the exhaust duct.

2. The reagent injection system of claim 1, wherein the plurality of injectors injector comprises a reagent injection grid including less than 100 injectors disposed at different locations around one of the first and second sections of the exhaust duct, and wherein each injector of the plurality of injectors has a different radial alignment relative to the longitudinal axis of the exhaust duct and the other injectors.

3. The reagent injection system of claim 2, wherein the reagent injection grid includes less than 20 injectors disposed at different locations around one of the first and second sections of the exhaust duct.

4. The reagent injection system of claim 1, wherein each injector of the plurality of injectors is configured to inject at least one of ammonia vapor, aqueous ammonia, and aqueous urea.

5. The reagent injection system of claim 4, further comprising at least one duct burner that is configured to introduce a secondary supply of heat energy into the reagent injection system at a location downstream of the plurality of injectors.

6. The reagent injection system of claim 1, wherein the second section has an increasing cross-sectional size moving from the entrance end to an exit end of the second section.

7. The reagent injection system of claim 1, further comprising a heat recovery steam generator, wherein the exit end of the second section is configured to be fluidly coupled to the heat recovery steam generator, and wherein the heat recovery steam generator includes a selective catalytic reduction catalyst for $NO_x$ reduction.

8. The reagent injection system of claim 7, wherein the heat recovery steam generator also includes a carbon monoxide catalyst, and wherein the selective catalytic reduction and carbon monoxide catalysts are provided adjacent to one another.

9. A reagent injection system for a catalytic emissions reduction assembly of a combustion turbine, the reagent injection system comprising:
an exhaust duct comprising:
a first section including an entrance end and an exit end, wherein the entrance end is configured to be fluidly coupled to the combustion turbine to receive exhaust gases therefrom; and
a second section having an entrance end that is fluidly coupled to the exit end of the first section;
at least one injector operatively coupled to one of the first and second sections, wherein the at least one injector is configured to inject a reagent into the exhaust gases flowing through the exhaust duct; and
at least one duct burner that is configured to introduce a secondary supply of heat energy into the reagent injection system at a location downstream of the at least one injector.

10. The reagent injection system of claim 9, wherein the at least one injector comprises a reagent injection grid that includes less than 10 injectors disposed at different locations around the first section of the exhaust duct.

11. The reagent injection system of claim 9, further comprising a heat recovery steam generator, wherein the exit end of the second section is configured to be fluidly coupled to the heat recovery steam generator, and wherein the heat recovery steam generator includes a selective catalytic reduction catalyst for $NO_x$ reduction.

12. The reagent injection system of claim 11, wherein the heat recovery steam generator also includes a carbon monoxide catalyst, and wherein the selective catalytic reduction and carbon monoxide catalysts are provided adjacent to one another.

13. A method for injecting a reagent into a stream of gases for a catalytic emissions reduction system of a combustion turbine, comprising:
exhausting gases and a supply of heat from the combustion turbine into a first end of an exhaust duct, the exhaust duct further including a second end that is fluidly coupled to a heat recovery steam generator, with an expansion throat located between the ends of the exhaust duct that includes an increasing cross-sectional size moving in a direction from the first end to the second end;
injecting a supply of reagent via a plurality of injectors into the exhaust duct at an upstream location from the expansion throat, the plurality of injectors extending radially inward toward a longitudinal axis of the exhaust duct; and
distributing the reagent and gases utilizing turbulence induced by the gases exiting the combustion turbine and the downstream expansion throat.

14. The method of claim 13, further comprising introducing the distributed reagent and gases into the heat recovery steam generator, wherein the heat recovery steam generator includes a catalyst assembly including at least one catalyst configured to expose the distributed reagent and gases to the at least one catalyst.

15. The method of claim 13, wherein the reagent introduced into the exhaust duct is an ammonia vapor.

16. The method of claim 13, wherein the reagent introduced into the exhaust duct comprises at least one of aqueous ammonia or aqueous urea.

17. The method of claim 16, wherein the aqueous ammonia is injected into the exhaust duct through an ammonia injection grid including less than 100 injectors disposed at different locations around the exhaust duct, and wherein each injector of the plurality of injectors has a different alignment relative to the exhaust duct when compared to the other injectors of the plurality of injectors of the injection grid.

18. The method of claim 17, wherein the ammonia injection grid includes less than 20 injectors disposed at different locations around the exhaust duct, and wherein each injector of the plurality of injectors has a different radial alignment relative to the longitudinal axis of the exhaust duct when compared to the other injectors of the plurality of injectors of the injection grid.

19. The method of claim 18, wherein the ammonia injection grid includes less than 10 injectors disposed at different locations around the exhaust duct, and wherein the radial alignment of each injector of the plurality of injectors is transverse to the longitudinal axis of the exhaust duct.

20. The method of claim 15, further comprising passing the distributed reagent and gases through the heat recovery steam generator, wherein the exit end of the second section is fluidly coupled to the heat recovery steam generator, and wherein the heat recovery steam generator includes a selective catalytic reduction catalyst for $NO_x$ reduction.

21. The method of claim 20, wherein the heat recovery steam generator also includes a carbon monoxide catalyst, and wherein the selective catalytic reduction and carbon monoxide catalysts are provided in-series relative to one another with the carbon monoxide catalyst provided downstream from the selective catalytic reduction catalyst.

22. The method of claim 13, further comprising introducing a secondary supply of heat energy into at least one of the exhaust duct and the expansion throat at a location downstream of the plurality of injectors through at least one duct burner.

23. A method for injecting a reagent into a stream of gases for a selective non-catalytic $NO_x$ emissions reduction system of a combustion turbine, comprising:
   exhausting gases and a first supply of heat energy from the combustion turbine into a first end of an exhaust duct, the exhaust duct further including a second end that is fluidly coupled to a heat recovery steam generator;
   injecting a supply of reagent via at least one injector into the exhaust duct at an upstream location from the heat recovery steam generator;
   distributing the reagent and gases induced by the high velocity gases exiting the combustion turbine; and
   introducing a secondary supply of heat energy at a location downstream of the at least one injector through at least one duct burner.

24. The method of claim 23, further comprising inducing turbulence to further distribute the reagent and gases via an expansion throat that includes an exit end having a larger cross-sectional size than an inlet end, which is fluidly coupled to the exhaust duct, wherein the expansion throat is located between the injector and the heat recovery steam generator.

25. The method of claim 23, wherein the heat recovery steam generator comprises:
   a carbon monoxide catalyst; and
   a selective catalytic reduction catalyst for $NO_x$ reduction.

* * * * *